UNITED STATES PATENT OFFICE.

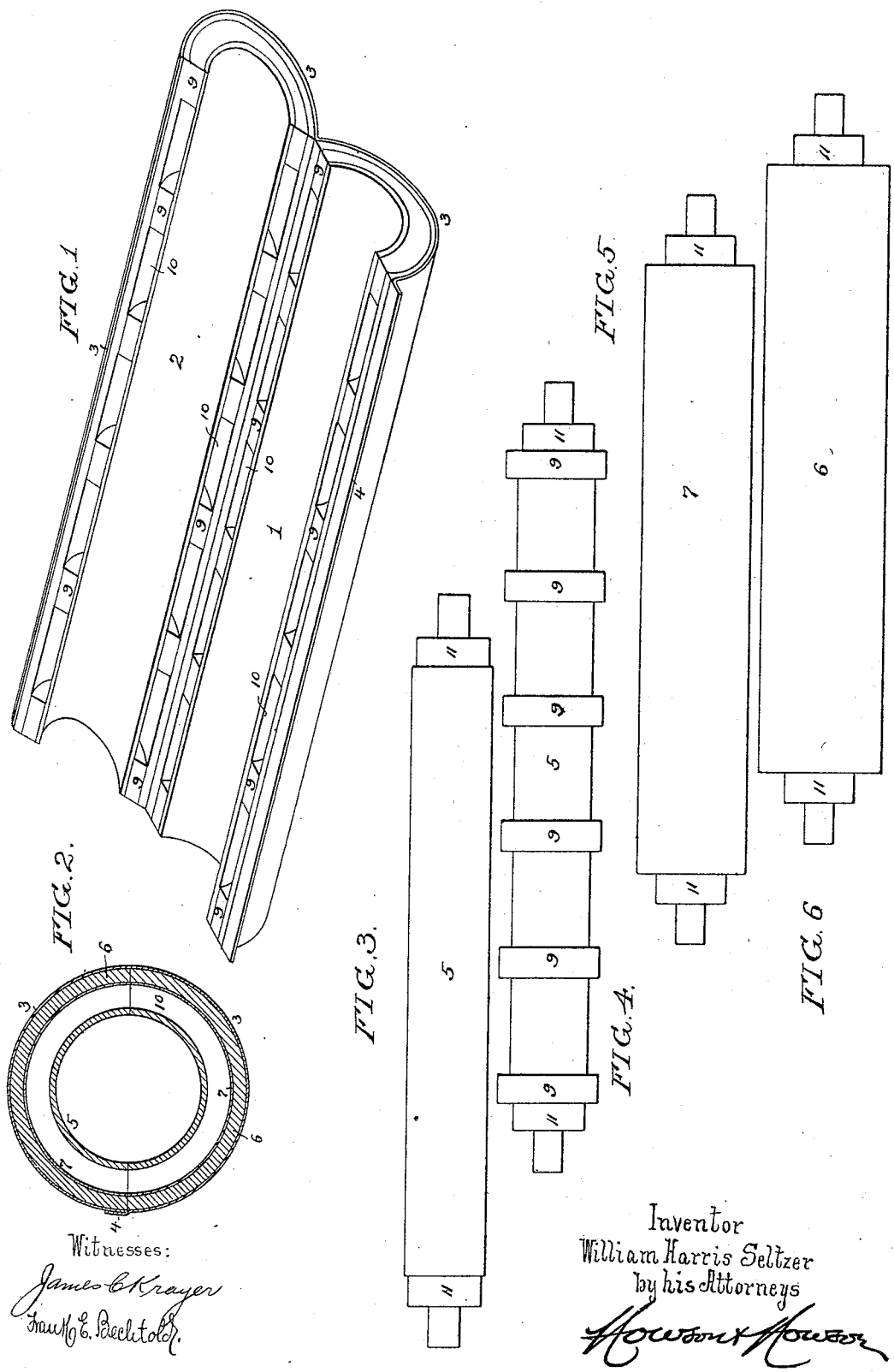

WILLIAM HARRIS SELTZER, OF PHILADELPHIA, PENNSYLVANIA, ASSIGNOR TO THE ASBESTOS MANUFACTURING COMPANY, OF SAME PLACE.

NON-CONDUCTING PIPE-COVERING.

SPECIFICATION forming part of Letters Patent No. 616,809, dated December 27, 1898.

Application filed February 24, 1898. Serial No. 671,454. (No model.)

*To all whom it may concern:*

Be it known that I, WILLIAM HARRIS SELTZER, a citizen of the United States, residing in Philadelphia, Pennsylvania, have invented certain Improvements in Non-Conducting Pipe-Coverings, of which the following is a specification.

The object of my invention is to provide a non-conducting pipe-covering which while comparatively cheap will be extremely light and will possess in high degree the quality of obstructing the transmission of heat through it. This object I attain in the manner hereinafter set forth, reference being had to the accompanying drawings, in which—

Figure 1 is a perspective view of a section of pipe-covering constructed in accordance with my invention, the two halves of the section being shown separated from each other as for application to a pipe. Fig. 2 is a transverse section of the pipe-covering on a larger scale, and Figs. 3, 4, 5 and 6 are views illustrating the method of making the covering.

Each section of my improved pipe-covering is composed of two semicylindrical segments 1 and 2 of any desired length and of a diameter suited to that of the pipe to which they are to be applied, these segments having an outer casing 3 of muslin, canvas, or the like, which serves to stiffen the same and to impart the desired surface finish and also as a hinge whereby the two segments are connected together at one side, a portion of this outer casing projecting from one of the segments, so as to form a flap 4, which when the said segments are closed upon the pipe overlaps the casing of the adjoining segment and is secured thereto by any available paste or cement.

Each segment of the pipe-covering consists of an inner layer 5 of asbestos millboard and an outer layer 6 of ordinary wool felt or material such as is usually employed in the manufacture of roofing, this outer layer 6 having by preference a lining 7 of asbestos millboard. Between the inner and outer layers of each segment are interposed filling-strips 9, which serve to brace the inner and outer layers, and thereby form a light but strong protective structure, and, what is more important, produce air-chambers 10, separated from each other, the air-chamber of one segment coinciding with those of the other segment when the two segments are applied to the pipe, so as to form dead-air chambers or spaces extending completely around the pipe, as shown in Fig. 2. Such dead-air chambers are well-known as non-conductors of heat. Hence they materially aid the outer layer of wool felt in the performance of the duty for which the covering is intended, while the layers 5 and 7 of asbestos millboard serve to insulate or isolate the outer layer of wool felt and prevent the heat of the pipe from injuriously affecting the integrity of the same.

In manufacturing a non-conducting pipe-covering in accordance with my invention I proceed as follows: Upon a suitable drum or mandrel 11 I first wrap the inner layer 5 of asbestos millboard, as shown in Fig. 3, and then I wind upon the same at suitable intervals strips of the same material to form a series of properly-spaced rings 9 of appropriate width and thickness, as shown in Fig. 4. To these rings are then applied the layer 7 of asbestos millboard, as shown in Fig. 5, and upon the latter is then wound the outer layer 6 of wool felt, as shown in Fig. 6, the successive convolutions or layers being secured together by any available paste or cement. The completed structure is then removed from the mandrel and subjected to a drying operation and is then severed on a longitudinal central line, so as to form two equal segments, to which the outer casing or covering 3 of muslin or canvas is then secured.

The number of filling strips or rings 9 may be varied in accordance with the desired stiffness of the product and the required air-chamber capacity, and in short sections the filling pieces or rings may in some cases be located at the ends of the section.

I prefer to use asbestos millboard because it is comparatively thick, and hence does not require such repeated wrapping around the mandrel in order to form the layers 5 and 7 as would be required if asbestos paper or felt was employed. The latter may, however, be used if desired, and in the claims I have used the term "asbestos fabric" to indicate any of these materials.

Having thus described my invention, I claim and desire to secure by Letters Patent—

1. A non-conducting cylindrical pipe-covering consisting of an inner layer of asbestos fabric and an outer layer of wool felt, with intervening air-space closed at the ends by abutting half-rings, each composed of strips interposed between the inner and outer layers of the covering, substantially as specified.

2. A non-conducting cylindrical pipe-covering consisting of an inner layer of asbestos fabric and an outer layer of wool felt with asbestos-fabric lining, there being between these two layers an intervening air-space closed at the ends by abutting half-rings composed of strips interposed between said inner and outer layers of the covering, substantially as specified.

In testimony whereof I have signed my name to this specification in the presence of two subscribing witnesses.

WILLIAM HARRIS SELTZER.

Witnesses:
F. E. BECHTOLD,
JOS. H. KLEIN.